United States Patent
Fernandez

(10) Patent No.: US 10,921,341 B2
(45) Date of Patent: *Feb. 16, 2021

(54) METHODS AND APPARATUS FOR GENERATING A UNIFORM RESPONSE IN A MAGNETIC FIELD SENSOR

(71) Applicant: Allegro MicroSystems, LLC, Manchester, NH (US)

(72) Inventor: Devon Fernandez, Londonderry, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/407,318

(22) Filed: May 9, 2019

(65) Prior Publication Data

US 2020/0355719 A1 Nov. 12, 2020

(51) Int. Cl.
  *G01P 3/44* (2006.01)

(52) U.S. Cl.
  CPC ..................... *G01P 3/44* (2013.01)

(58) Field of Classification Search
  CPC .......... G01P 3/44; G01P 13/045; G01P 3/489; G01R 33/07; G01R 33/09; G01R 33/0029
  See application file for complete search history.

(56) References Cited

U.S. PATENT DOCUMENTS

| | | | |
|---|---|---|---|
| 3,697,870 A | 10/1972 | Brenner | |
| 4,405,896 A | 9/1983 | Akita | |
| 5,339,067 A | 8/1994 | Harris et al. | |
| 5,373,400 A | * | 12/1994 | Kovacs ............ G11B 20/10009 327/62 |
| 5,442,283 A | 8/1995 | Vig et al. | |
| 5,497,084 A | 3/1996 | Bicking | |

(Continued)

FOREIGN PATENT DOCUMENTS

| | | |
|---|---|---|
| CN | 102 388 316 | 3/2012 |
| EP | 2 391 903 | 12/2012 |

(Continued)

OTHER PUBLICATIONS

Advisory Action dated Feb. 23, 2018 for U.S. Appl. No. 14/600,826; 6 Pages.

(Continued)

*Primary Examiner* — Akm Zakaria
(74) *Attorney, Agent, or Firm* — Daly, Crowley, Mofford & Durkee, LLP

(57) ABSTRACT

A magnetic field sensor for detecting motion of an object includes one or more magnetic field sensing elements configured to generate a magnetic field signal in response to a magnetic field associated with the object. A motion detector responsive to the magnetic field signal and to a threshold signal is configured to generate a detector output signal having edges occurring in response to a comparison of the magnetic field signal and the threshold signal. A speed detector responsive to the detector output signal generates a speed signal indicative of a speed of motion of the object. A delay processor is responsive to the speed signal and configured to determine a delay for the detector output signal based on the speed of motion of the object.

33 Claims, 5 Drawing Sheets

(56) References Cited

U.S. PATENT DOCUMENTS

| | | | | |
|---|---|---|---|---|
| 5,554,948 | A | * | 9/1996 | Hansen .................. G01P 3/489 |
| | | | | 324/166 |
| 5,650,719 | A | | 7/1997 | Moody et al. |
| 5,670,886 | A | | 9/1997 | Wolff et al. |
| 5,729,130 | A | | 3/1998 | Moody et al. |
| 5,873,006 | A | * | 2/1999 | Iwane .................... G02B 7/28 |
| | | | | 396/95 |
| 5,917,320 | A | | 6/1999 | Scheller et al. |
| 6,091,239 | A | | 7/2000 | Vig et al. |
| 6,100,680 | A | | 8/2000 | Vig et al. |
| 6,242,908 | B1 | | 6/2001 | Scheller et al. |
| 6,289,072 | B1 | | 9/2001 | Hubbard et al. |
| 6,317,381 | B1 | * | 11/2001 | Gans ...................... G11C 7/22 |
| | | | | 365/194 |
| 6,356,741 | B1 | | 3/2002 | Bilotti et al. |
| 6,404,188 | B1 | | 6/2002 | Ricks |
| 6,525,531 | B2 | | 2/2003 | Forrest et al. |
| 6,693,419 | B2 | | 2/2004 | Stauth et al. |
| 6,853,178 | B2 | | 2/2005 | Hayat-Dawoodi |
| 6,919,720 | B2 | | 7/2005 | Vig et al. |
| 7,199,579 | B2 | | 4/2007 | Scheller et al. |
| 7,362,094 | B2 | | 4/2008 | Voisine et al. |
| 8,058,864 | B2 | | 11/2011 | Scheller et al. |
| 8,089,270 | B2 | | 1/2012 | Scheller et al. |
| 8,350,563 | B2 | | 1/2013 | Haas et al. |
| 8,624,588 | B2 | | 1/2014 | Vig et al. |
| 9,395,391 | B2 | | 7/2016 | Fernandez et al. |
| 9,970,996 | B2 | * | 5/2018 | Fernandez .............. F02P 7/067 |
| 2003/0231013 | A1 | * | 12/2003 | Faymon .................. G01P 3/488 |
| | | | | 324/166 |
| 2005/0226201 | A1 | * | 10/2005 | McMillin ............. H04W 88/04 |
| | | | | 370/348 |
| 2006/0119348 | A1 | * | 6/2006 | Blossfeld ............ F02D 41/0097 |
| | | | | 324/166 |
| 2009/0001972 | A1 | | 1/2009 | Fernandez et al. |
| 2012/0249126 | A1 | | 10/2012 | Friedrich et al. |
| 2018/0031594 | A1 | * | 2/2018 | Joseph .................... F02D 41/28 |

FOREIGN PATENT DOCUMENTS

| | | |
|---|---|---|
| JP | 2005 517 187 | 6/2005 |
| JP | 2007 132 706 | 5/2007 |
| JP | 2012 520 460 | 9/2012 |
| WO | WO 03/067269 | 8/2003 |

OTHER PUBLICATIONS

Advisory Action dated Mar. 14, 2017 for U.S. Appl. No. 14/600,826; 6 Pages.
Chinese Certificate of Patent dated Apr. 2, 2014 for Chinese Application No. 201080011537.8; 4 pages.
Chinese Office Action with English translation dated Jan. 28, 2014 for Chinese Application No. 201080011537.8; 6 pages.
Chinese Office Action with English translation dated Jun. 28, 2013 for Chinese Application No. 201080011537.8; 17 pages.
Comments to Office Action dated Jan. 28, 2014 for Chinese Application No. 201080011537.8; 1 page.
Datasheet, Allegro Microsystems, Inc., "ATS633LSB True Power On, Self-Calibrating, Zero Speed Gear Tooth Sensor System," 2001, 2003, 15 pages.
Datasheet, Allegro Microsystems, Inc., "ATS637LSA, True Power On, Self-Calibrating, Zero Speed Gear.Tooth Sensor System," Aug. 2001, 13 pages.
English translation of Japanese Office Action dated May 13, 2013 for Japanese Application No. 2011-554057; 2 pages.
European Decision to Grant dated Nov. 15, 2012 for European Application No. 10701269.2; 2 pages.
European Notice of Allowance dated Aug. 14, 2012 for European Application No. 10701269.2; 6 pages.
Final Office Action dated May 5, 2011 for U.S. Appl. No. 12/425,528; 14 pages.
Final Office Action dated Nov. 30, 2017 for U.S. Appl. No. 14/600,826; 16 Pages.
Instruction Letter for responding to Chinese Office Action dated Jun. 28, 2013 for Chinese Application No. 201080011537.8; 7 pages.
Instruction Letter for responding to Chinese Office Action dated Jan. 28, 2014 for Chinese Application No. 201080011537.8; 1 pages.
Instruction Letter for responding to Japanese Office Action dated May 13, 2013 for Japanese Application No. 2011-554057; 2 pages.
Instruction Letter for responding to Korean Office Action dated Sep. 30, 2014 for Korean Application No. 10-2011-7023484; 2 pages.
International Preliminary Report on Patentability dated Sep. 22, 2011 for International Application No. PCT/US2010/020602, 8 pages.
Japanese Notice of Allowance dated Oct. 30, 2013 for Japanese Application No. 2011-554057; 3 pages.
Korean Certificate of Patent dated Apr. 28, 2015 for Korean Application No. 10-2011-7023484; 24 pages.
Korean Notice of Allowance with English translation and allowed claims dated Apr. 20, 2015 for Korean Application No. 10-2011-7023484; 9 pages.
Korean Office Action with English translation dated Sep. 30, 2014 for Korean Application No. 10-2011-7023484; 6 pages.
Korean Response to Office Action filed Dec. 30, 2014 for Korean Application No. 10-2011-7023484; 14 pages.
National Semiconductor, ADC0852/ADC0854 Multiplexed Comparator with 8-bit Reference Divider; Apr. 1995; 20 Pages.
Notice of Allowance dated Mar. 26, 2018 for U.S. Appl. No. 14/600,826; 9 Pages.
Notice of Allowance dated Oct. 6, 2011 for U.S. Appl. No. 12/401,096; 18 pages.
Notice of Allowance dated Sep. 14, 2011 for U.S. Appl. No. 12/425,528; 9 pages.
Office Action dated Jan. 3, 2011 for U.S. Appl. No. 12/425,528; 14 pages.
Office Action dated May 19, 2016 for U.S. Appl. No. 14/600,826; 16 Pages.
Office Action dated May 19, 2017 for U.S. Appl. No. 14/600,826; 14 Pages.
Office Action dated Nov. 18, 2016 for U.S. Appl. No. 14/600,826; 15 Pages.
Preliminary Amendment filed Apr. 12, 2010 for U.S. Appl. No. 12/401,096; 7 pages.
Response to Chinese Office Action dated Feb. 13, 2014 for Chinese Application No. 201080011537.8; 8 pages.
Response to Chinese Office Action dated Nov. 8, 2013 for Chinese Application No. 201080011537.8; 10 pages.
Response to Final Office Action dated Nov. 18, 2016 for U.S. Appl. No. 14/600,826 as filed on Jan. 31, 2017; 12 Pages.
Response to Final Office Action dated Nov. 18, 2016 and Advisory Action dated Mar. 14, 2017 for.U.S. Appl. No. 14/600,826 as filed on Mar. 17, 2017; 14 Pages.
Response to Final Office Action dated Nov. 30, 2017 for U.S. Appl. No. 14/600,826 as filed on Feb. 26, 2018; 11 Pages.
Response to Final Office Action dated Nov. 30, 2017 for U.S. Appl. No. 14/600,826 as filed on Jan. 9, 2018; 10 Pages.
Response to Final Office Action filed Jul. 5, 2011 for U.S. Appl. No. 12/425,528; 15 pages.
Response to International Preliminary Report on Patentability dated Oct. 11, 2011 for European Application No. 10701269.2; 14 pages.
Response to Office Action dated May 19, 2016 for U.S. Appl. No. 14/600,826 as filed on Aug. 9, 2016; 10 Pages.
Response to Office Action dated May 19, 2017 for U.S. Appl. No. 14/600,826 as filed on Aug. 14, 2017; 12 Pages.
Response to Office Action dated Jan. 3, 2011 for U.S. Appl. No. 12/425,528 as filed on Apr. 1, 2011; 14 pages.
Response to Office Action with English claims dated Jul. 31, 2013 for Japanese Application No. 2011-554057; 5 pages.
Search Report and Written Opinion dated Mar. 26, 2010 for PCT Application No. PCT/US2010/020602; 13 pages.

* cited by examiner

METHODS AND APPARATUS FOR GENERATING A UNIFORM RESPONSE IN A MAGNETIC FIELD SENSOR

CROSS-REFERENCE TO RELATED APPLICATIONS

Not Applicable.

STATEMENT REGARDING FEDERALLY SPONSORED RESEARCH

Not Applicable.

FIELD

This disclosure relates generally to magnetic field sensors, and, more particularly, to magnetic field sensors having a uniform target detection response at varying target speeds.

BACKGROUND

As is known, magnetic field sensors are used in a variety of applications. One example application is in motion (e.g., rotation) detectors where a magnetic field sensor is used to detect motion of an object, such as a ferromagnetic object, for example, a gear or ring magnet. In motion detectors, the magnetic field associated with the object is typically detected by a magnetic field sensing element, such as a Hall effect element or a magnetoresistance element, which provides a signal (i.e., a magnetic field signal) proportional to a detected magnetic field.

Some motion detectors generate an output signal indicative of the speed of motion of the object. Other motion detectors generate an output signal indicative of a direction of motion of the object as well. One such motion detector is described in U.S. Pat. No. 8,624,588 entitled "Apparatus and Method for Providing an Output Signal Indicative of a Speed of Rotation and a Direction of Rotation as a Ferromagnetic Object," which is assigned to the assignee of the present disclosure and incorporated herein by reference in its entirety.

Motion detectors are widely used in automobile control systems, for example to detect motion of a target object (e.g., camshaft) and to provide information (e.g., an absolute angle of rotation of the target object as it rotates) to an engine control processor for ignition timing control, fuel management and other operations. With this information, the engine control processor can adjust the timing of firing of the ignition system, the timing of fuel injection by the fuel injection system and perform other operations.

In high precision applications such as automobiles, accuracy variations in the detected motion of a target object (e.g., resulting from irregularities in a sensed target profile of the target object) can be problematic. Engine ignition timing, for example, depends on consistent detection accuracy. Some magnetic field sensor integrated circuits (ICs) contain circuitry and methods to mitigate the effects of irregularities resulting from mechanical variations such as rotational wobble or changes in an air gap between the IC and the target object.

SUMMARY

The present disclosure provides a magnetic field sensor and associated methods capable of generating a uniform target detection response at varying target speeds. The described circuitry and methods can mitigate variation in the sensor response due to different target speeds and thereby improve detection accuracy of the magnetic field sensor.

In one aspect, a magnetic field sensor for detecting motion of an object includes one or more magnetic field sensing elements configured to generate a magnetic field signal in response to a magnetic field associated with the object. The magnetic field sensor additionally includes a motion detector responsive to the magnetic field signal and to a threshold signal and configured to generate a detector output signal having edges occurring in response to a comparison of the magnetic field signal and the threshold signal. A speed detector responsive to the detector output signal generates a speed signal indicative of a speed of motion of the object. A delay processor responsive to the speed signal is configured to determine a delay for the detector output signal based on the speed of motion of the object.

The magnetic field sensor may include one or more of the following features. The delay processor may be configured to determine one or both of whether to apply a delay to the detector output signal and an amount of the delay to be applied to the detector output signal. In embodiments, the delay processor is configured to determine that the delay be applied to the detector output signal if the speed of motion of the object is lower than a predetermined level. The delay may be a duration that is linearly proportional to the speed of motion of the object. The delay may be a duration that is piecewise linear with respect to the speed of motion of the object. The delay processor may include a memory device configured to store a plurality of delay durations, each corresponding to one or more speeds of motion of the object. The delay processor may be configured to compute the delay based on a mathematical function that characterizes a relationship between the delay and the speed of motion of the object.

The magnetic field sensor may further include a delay element configured to apply the delay to the detector output signal. In embodiments, the delay element may include a filter coupled to the delay processor. In embodiments, the delay element may include a digital element coupled to the delay processor and the delay may correspond to a speed of a clock associated with the digital element. For example, the digital element may include an analog-to-digital converter.

In embodiments, the speed detector may include a counter responsive to the detector output signal and configured to generate a count signal having a value corresponding to a duration between like edges of the detector output signal. The speed detector may further include a filter responsive to the count signal and configured to generate the speed signal. The speed signal may be generated as an average of a predetermined number of count signal values, wherein the predetermined number of count signal values corresponds to a number of features of the object.

The magnetic field sensor may further include a threshold generator responsive to the speed signal to generate the threshold signal having a level that varies in response to the speed signal. In embodiments, the threshold signal can be at a first signal level when the speed signal indicates a speed of motion of the object greater than a predetermined speed and at a second signal level when the speed signal indicates a speed of motion of the object less than the predetermined speed. The threshold generator may include a memory device configured to store a plurality of threshold adjustment amounts, each corresponding to one or more speeds of motion of the object. The threshold generator may further include a summing circuit responsive to at least a stored threshold adjustment amount and configured to generate the threshold signal.

The object may be comprised of a magnetic material and the magnetic field may be generated by the object. The magnetic field sensor may further include a magnet to generate the magnetic field and the object may be comprised of a ferromagnetic material and the magnetic field may be affected by movement of the object. The magnetic field sensing elements may be Hall effect elements and/or magnetoresistance elements.

The motion detector may include a tracking circuit responsive to the magnetic field signal and configured to track peaks of the magnetic field signal and generate a tracking signal. The threshold generator may be further responsive to the tracking signal to generate the threshold signal. The detector output signal may transition when a difference between one or more tracked peaks of the magnetic field signal and the threshold signal exceeds a predetermined amount. The tracking signal may track positive and negative peaks of the magnetic field signal and the threshold signal may be provided as a predetermined percentage of a peak-to-peak value of the tracking signal.

In another aspect, a method for detecting motion of an object includes receiving a magnetic field signal generated in response to a magnetic field associated with an object and generating a detector output signal in response to the magnetic field signal and a threshold signal, the detector output signal having edges occurring in response to a comparison of the magnetic field signal and the threshold signal. The method additionally includes generating a speed signal indicative of a speed of motion of the object in response to the detector output signal and determining a delay for the detector output signal based on the speed of motion of the object.

Features of the method may include one or more of the following. Determining the delay may include one or both of whether to apply a delay to the detector output signal and an amount of the delay to be applied to the detector output signal. In embodiments, determining the delay includes determining that the delay be applied to the detector output signal if the speed of motion of the object is lower than a predetermined level. The delay may include a duration that is linearly proportional to the speed of motion of the object. The delay may include a duration that is piecewise linear with respect to the speed of motion of the object. In embodiments, the method may further include filtering the magnetic field signal with a filter and applying the delay with the filter. The method may further include converting the magnetic field signal into a digital signal with an analog-to-digital converter and applying the delay by adjusting a clock signal coupled to the analog-to-digital converter. The method may further include generating the threshold signal in response to the speed signal, the threshold signal having a level that varies in response to the speed signal.

According to a further aspect, a magnetic field sensor for detecting motion of an object includes one or more magnetic field sensing elements configured to generate a magnetic field signal in response to a magnetic field associated with the object. The magnetic field sensor additionally includes a motion detector responsive to the magnetic field signal and to a threshold signal and configured to generate a detector output signal having edges occurring in response to a comparison of the magnetic field signal and the threshold signal. A speed detector responsive to the detector output signal generates a speed signal indicative of a speed of motion of the object. Also provided is means, responsive to the speed signal, for determining a delay for the detector output signal based on the speed of motion of the object.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
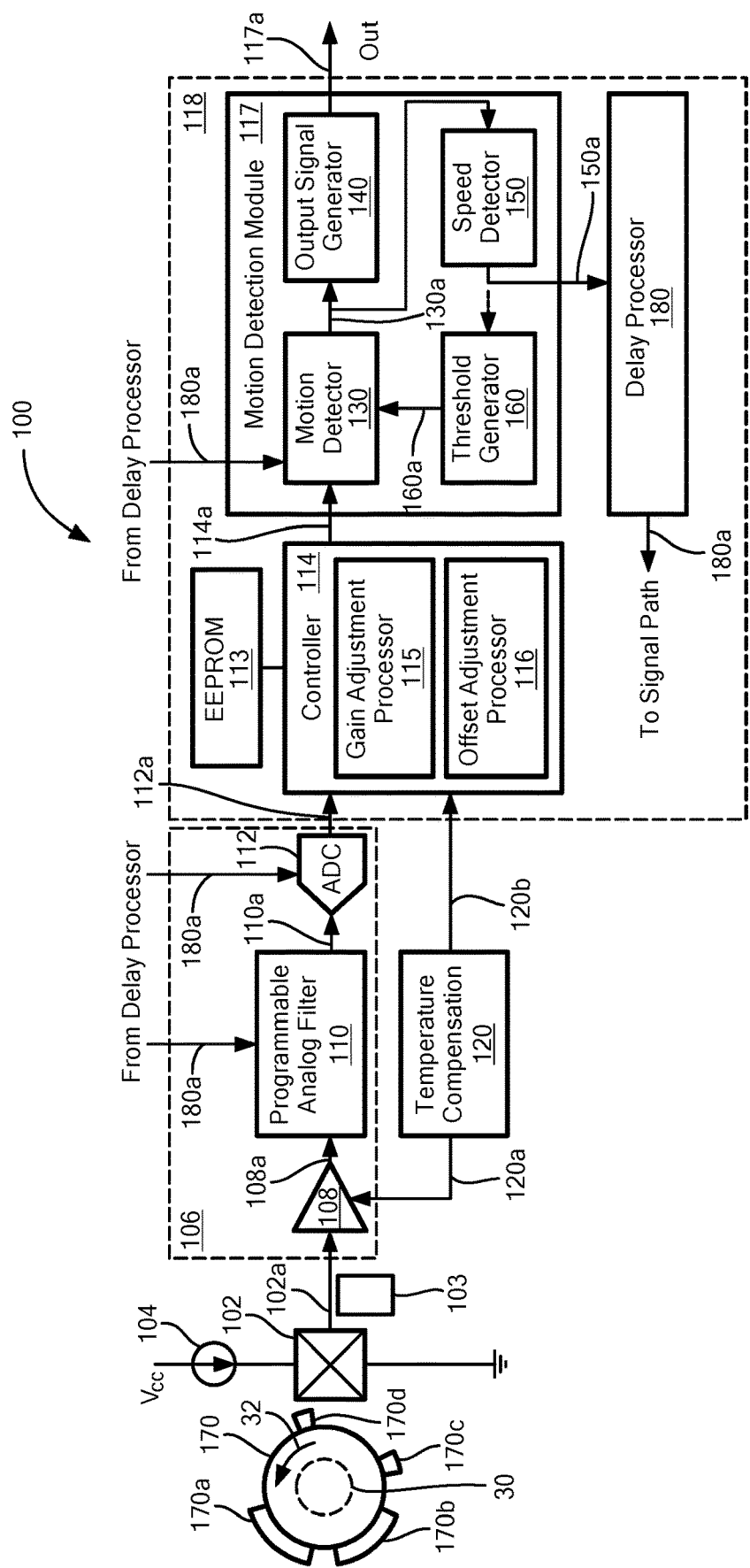
FIG. 1 is a block diagram of an example magnetic field sensor for detecting motion of an object, the magnetic field sensor shown proximate to an example object.

The features and other details of the disclosure will now be more particularly described. It will be understood that any specific embodiments described herein are shown by way of illustration and not as limitations of the concepts, systems and techniques described herein. The principal features of this disclosure can be employed in various embodiments without departing from the scope of the concepts sought to be protected.

For convenience, certain introductory concepts and terms used in the specification are collected here.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied, for example, in a specially programmed microprocessor, a digital signal processor (DSP), or an application specific integrated circuit (ASIC), which can be an analog ASIC or a digital ASIC. Additionally, in some embodiments the "processor" can be embodied in configurable hardware such as field programmable gate arrays (FPGAs) or programmable logic arrays (PLAs). In some embodiments, the "processor" can also be embodied in a microprocessor with associated program memory. Furthermore, in some embodiments the "processor" can be embodied in a discrete electronic circuit, which can be an analog circuit, a digital circuit or a combination of an analog circuit and a digital circuit. The "controller" described herein may be provided as a "processor."

As used herein, the term "motion" is used to describe a variety of types of movement associated with an object, for example, including rotational movement (or "rotation") and linear (or "rectilinear") movement of the object. A "motion detector" may, for example, detect rotation of an object. A "rotation detector" is a particular type of "motion detector."

While magnetic field sensors including a single magnetic field sensing element are described in examples below, a single magnetic field sensing element is discussed to promote simplicity, clarity and understanding in the description of the concepts, systems, circuits and techniques sought to be protected herein and is not intended to be, and should not be construed as, limiting. The concepts, circuits and techniques disclosed herein may, of course, be implemented using more than a single magnetic field sensing element.

Referring now to FIG. 1, a magnetic field sensor 100 capable of detecting motion (e.g., speed of motion and/or direction of motion) of a target object having features, e.g., gear teeth 170a, 170b, 170c, 170d of a ferromagnetic gear 170, is shown. The object 170 can be disposed, for example, upon a shaft 30 configured to rotate in a direction 32. The terms "object" and "target" are used synonymously herein.

The magnetic field sensor 100 includes one or more magnetic field sensing elements, as indicated by magnetic field sensing element 102 in the example embodiment shown. The magnetic field sensing element 102 is driven by a current source 104 and configured to generate a magnetic field signal 102a in response to a magnetic field associated with the object 170 as may be generated, for example, by a magnet 103 disposed proximate to or within the magnetic field sensor 100. Motion of the object 170 can result in variations of the magnetic field sensed by the magnetic field sensing element 102 and, thus, result in variations of the magnetic field signal 102a generated by the magnetic field sensing element 102.

Although the magnetic field sensing element 102 is depicted as a Hall effect element, in some embodiments the magnetic field sensing element 102 is, for example, provided as a magnetoresistance element where the magnetoresistance element may be an anisotropic magnetoresistance (AMR) element, a giant magnetoresistance (GMR) element, a tunneling magnetoresistance (TMR) element, a magnetic tunnel junction (MTJ) element, or a spin valve element. It should be appreciated that the magnetic field sensing element 102 (which may comprise more than one magnetic field sensing element in some embodiments) may take any form suitable for detecting motion of the object 170 by sensing a magnetic field affected by such motion.

The object 170 may be a ferromagnetic object. The ferromagnetic object can be a magnetic object and the magnetic field detected by the magnetic field sensing element 102 may be generated by the object 170 itself and may vary depending on positions of the object 170 relative to the magnetic field sensor 100.

Furthermore, although the object 170 is shown in the form of a ferromagnetic gear in the example embodiment, the object 170 may take other forms. For example, the object 170 may take the form of a ring magnet having magnetic domains that are detected by the magnetic field sensor 100. Additionally, the object 170 may be coupled to an automobile wheel, steering shaft, or a camshaft, as a few examples.

The magnetic field sensor 100 includes a temperature compensation circuit 120 (e.g., to compensate for temperature induced changes in sensitivity of the magnetic field sensing element 102, and therefore, a magnitude of the magnetic field signal 102a), which circuit is preferably disposed on the same substrate as other circuitry of the magnetic field sensor 100. The temperature compensation circuit 120 is configured to generate temperature compensation signals 120a, 120b indicative of a temperature experienced by the magnetic field sensing element 102 as may be sensed by a temperature sensor, for example, which may be provided as part of the temperature compensation circuit 120 and disposed proximate to the magnetic field sensing element 102. One such temperature compensation circuit is described in U.S. Pat. No. 9,395,391, entitled "Magnetic Field Sensor and Associated Method That Can Store a Measured Threshold Value in a Memory Device During a Time When The Magnetic Field Sensor is Powered Off," which is assigned to the assignee of the present disclosure and incorporated herein by reference in its entirety.

The magnetic field sensor 100 additionally includes a signal path 106 (e.g., an analog or mixed signal path) coupled to receive the magnetic field signal 102a and configured to generate a signal (e.g., digital signal 112a) representative of the magnetic field signal 102a. The signal path includes an amplifier 108, a filter 110 and an analog-to-digital converter (ADC) 112 in the example embodiment shown.

The amplifier 108 is coupled to receive the magnetic field signal 102a generated by the magnetic field sensing element 102 and temperature compensation signal 120a and configured to generate a temperature adjusted signal 108a. The filter 110, which can be a programmable analog filter, for example, is coupled to receive the temperature adjusted signal 108a and configured to generate a filtered signal 110a.

The ADC 112 is coupled to receive the filtered signal 110a and configured to generate a corresponding digital signal 112a.

The magnetic field sensor 100 further includes motion detection circuitry 118 including a memory device 113 (e.g., EEPROM), a controller 114, a motion detection module 117, and a delay processor 180. The controller 114 is coupled to receive the digital signal 112a and the temperature signal 120b, which can be the same as or similar to temperature signal 120a, and configured to generate a controller output signal 114a having gain and/or offset correction. The controller 114, which can be a synchronous digital controller or an analog controller, for example, includes a gain adjustment processor 115 and an offset adjustment processor 116 in the example embodiment shown. The gain adjustment processor 115 and the offset adjustment processor 116 can be coupled to receive stored gain correction coefficients and stored offset correction coefficients, respectively, from a memory device 113 (e.g., EEPROM), with the controller output signal 114a generated accordingly.

The memory device 113 is configured to store one or more gain correction coefficients and one or more offset correction coefficients, e.g., at the time of manufacture of the magnetic field sensor 100, or at any time thereafter. It will be appreciated that the one or more gain correction coefficients and the one or more offset correction coefficients may be established in a variety of manners, such as those described in U.S. Pat. No. 8,350,563 entitled "Magnetic field sensor and method used in a magnetic field sensor that adjusts a sensitivity and/or an offset over temperature" which is assigned to the assignee of the present disclosure and incorporated herein by reference in its entirety.

The motion detection module 117 is coupled to receive the controller output signal 114a and configured to generate a motion detection output signal 117a indicative of one or more of a speed of motion of the object 170 or a direction of motion of the object 170. The motion detection module 117 includes a motion detector 130 responsive to the controller output signal 114a (i.e., a magnetic field signal) and to a threshold signal 160a and configured to generate a detector output signal 130a having edges occurring in response to a comparison of the controller output signal 114a and the threshold signal 160a. The motion detection module 117 also includes a speed detector 150 responsive to the motion detector output signal 130a to generate a speed signal 150a indicative of a speed of motion of the object 170. The motion detection module 117 additionally includes a threshold generator 160 to generate the threshold signal 160a. The motion detection module 117 may further include an output signal generator 140 responsive to the motion detector output signal 130a to generate the motion detection output signal 117a. In some embodiments, the threshold generator 160 may be responsive to the speed signal 150a as explained below in connection with FIG. 5 and as illustrated by the dotted line connection of speed signal 150a to the threshold generator.

The edges of the motion detector output signal 130a coincide with locations on the target object 170. The edge locations on the target object 170 may, for example, correspond to mechanical or magnetic target features such as tooth edges, tooth centers, notch centers, pole boundaries, or pole maxima. Ideally, each output signal edge accurately coincides with a respective target location; however, mechanical variations (such as varying air gap and target irregularities) can adversely affect edge accuracy. Additionally, electrical delay through the magnetic field sensor 100 can adversely affect edge accuracy.

According to the disclosure, delay processor 180 is responsive to the speed signal 150a and is configured to determine a delay for the detector output signal 117a based on the speed of motion of the target 170 in order to minimize such inaccuracies by maintaining a constant detection accuracy over speed.

While the magnetic field sensor 100 may be provided in the illustrated form of an integrated circuit with an analog front end portion and a digital portion, it will be appreciated that the particular delineation of which circuit functions are implemented in an analog fashion or with digital circuitry and signals can be varied. Further, some of the illustrated circuit functions can be implemented on an integrated circuit sensor 100 and other circuitry and functionality can be implemented on separate circuits (e.g., additional substrates within the same integrated circuit package, or additional integrated circuit packages, and/or on circuit boards).

In some embodiments, one or more portions of the delay processor 180 and/or of the motion detection module 117 (e.g., motion detector 130, output signal generator 140, speed detector 150, threshold generator 160) may be provided as part of the controller 114. Thus, the controller 114 can perform the function, operation, or sequence of operations of one or more portions of the delay processor 180 and/or motion detection module 117. Moreover, in some embodiments, the memory device 113 is provided as part of the controller 114 and/or the motion detection module 117 (e.g., as onboard EEPROM).

Figure 2:
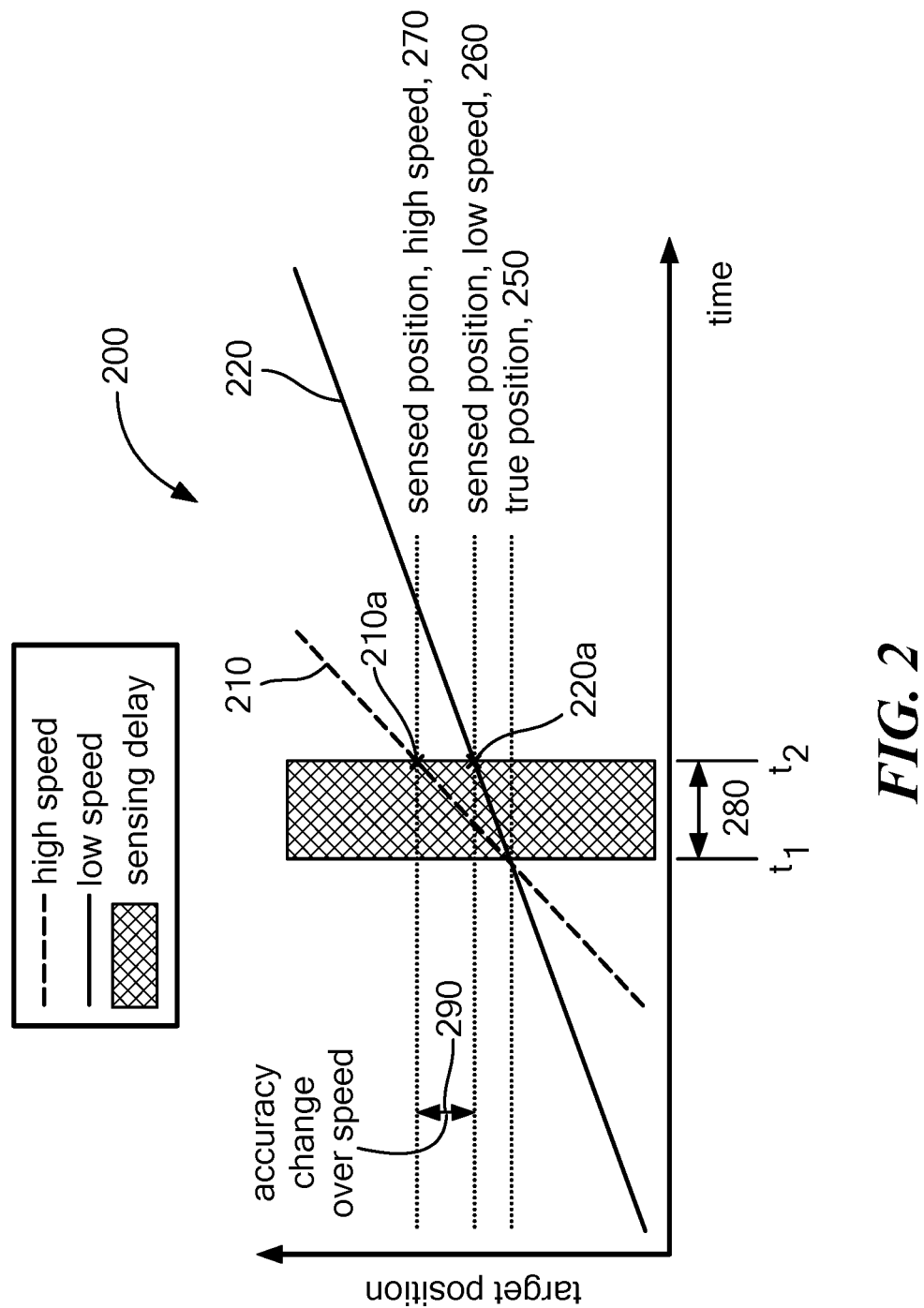
FIG. 2 illustrates example conventional target position detection over time for a target moving at high speed and a target moving at lower speed.

Referring to FIG. 2, illustrative signal waveforms as may be generated by a conventional magnetic field sensor (not shown) are shown in a plot 200 having a horizontal axis with a scale in arbitrary units of time and a vertical axis with a scale in arbitrary units to represent a position of a target relative to the magnetic field sensor, such as degrees of target rotation. The plot 200 includes waveforms 210 and 220 illustrating target detection by the magnetic field sensor when the target is moving at a first speed and a second, lower speed, respectively. The slope of the signals 210, 220 varies in response to the speed of the object, as shown.

An inherent sensing delay 280 is illustrated as occurring between times t1 and t2 and corresponds to an electrical delay inherent in processing the magnetic field signal. In other words, the inherent delay 280 can be attributable to operation of elements by which the magnetic field signal is processed and/or the finite bandwidth of the magnetics.

The plot 200 additionally includes a horizontal line 250 to indicate a true or actual position of the target as is desired to be detected. Horizontal lines 260 and 270 illustrate actual sensed target positions attributable to the inherent sensing delay 280 for a slow moving target and a faster moving target, respectively.

As a result of the inherent processing delay 280 of the magnetic field sensor, the detected target position 210a (i.e., switchpoint) for a fast moving target is greater than the detected target position 220a (i.e., switchpoint) for a slower moving target, thereby resulting in a change in the detection accuracy over speed (as indicated by arrow 290).

In accordance with the concepts, systems, circuits and techniques described herein, by determining a delay for the detector output signal 130a (FIG. 1) based on the speed of motion of the target, detection accuracy over speed is improved.

Figure 3:
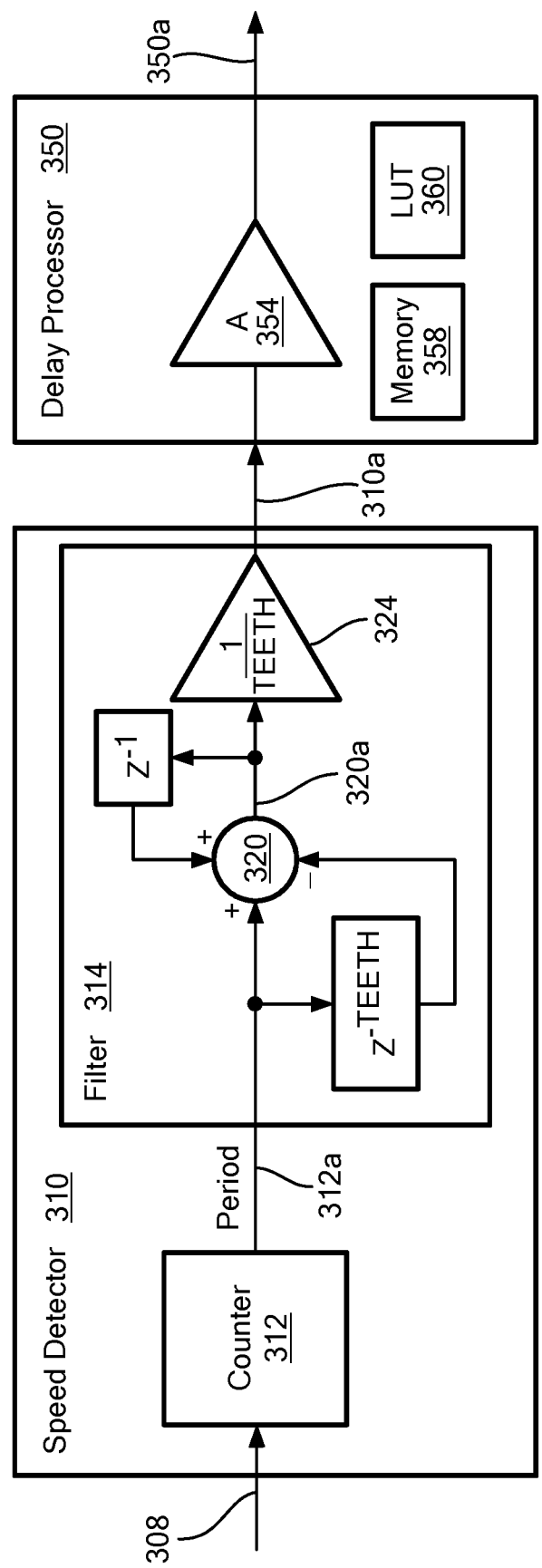
FIG. 3 is a block diagram of an example delay processor and an example speed detector of the motion detection module of FIG. 1.

Referring to FIG. 3, a speed detector 310, which can be the same as or similar to the speed detector 150 (FIG. 1) is shown coupled to a delay processor 350, which can be the same as or similar to the delay processor 180 (FIG. 1). The speed detector 310 includes a counter 312 (e.g., a pulse counter) and a filter 314 in the example embodiment shown. The speed detector 310 is responsive to a detector output signal 308 (that may be the same as or similar to detector output signal 130a of FIG. 1) and to a clock signal (not shown) as may be generated by an oscillator coupled to an input of the speed detector 310, to generate a speed signal 310a indicative of a speed of motion of the object (e.g., object 170, shown in FIG. 1) and that may be the same as or similar to speed signal 150a (FIG. 1).

The counter 312, which can be a binary counter (e.g., an 8-*bit* binary counter) according to some embodiments, is responsive to the detector output signal 308 and the clock signal and is configured to generate a count signal 312a having a value corresponding to a duration between like edges of the detector output signal 308 (i.e., corresponding to the period of the detector output signal).

The filter 314 is responsive to the count signal 312a and is configured to generate the speed signal 310a. In some embodiments, the speed signal 310a is generated as an average of a predetermined number of count signal values. The predetermined number of count signal values may, for example, correspond to a number of features (e.g., gear teeth) of the object (e.g., object 170, shown in FIG. 1).

More particularly, the filter 314 can include a summation module 320 and an amplifier 324. The summation module 320 is coupled to receive the count signal 312a and configured to generate a summation output signal 320a indicative of a summation of a predetermined number of count signal samples. The amplifier 324 can apply a gain inversely proportional to the predetermined number of samples. The predetermined number of samples may be the number of features (e.g., gear teeth) of the object (e.g., 170 in FIG. 1) over which an average is desired. Thus, the speed signal 310a may, for example, be calculated as an average of N samples (e.g., count signal values) of the count signal 312a, with the number N corresponding to the number of features of the object. As one example, N may be eight, so that the speed signal 310a represents a running average of the previous eight count signal values.

The delay processor 350 can be represented as a gain unit 354 having a gain "A". The delay processor 350 is configured to determine a delay for the detector output signal based on the speed of motion of the target. By selectively delaying (or not delaying) the detector output signal (e.g., signal 130a of FIG. 1), detection accuracy can be made consistent, or uniform over a range of target speeds. Examples of relationships between the determined delay 350a and the speed signal 310a are described below. Suffice it to say here that the delay can be introduced by applying a scalar gain factor "A" to the speed signal 310a in order to thereby determine the delay 350a to be applied to the detector output signal.

Figure 4:
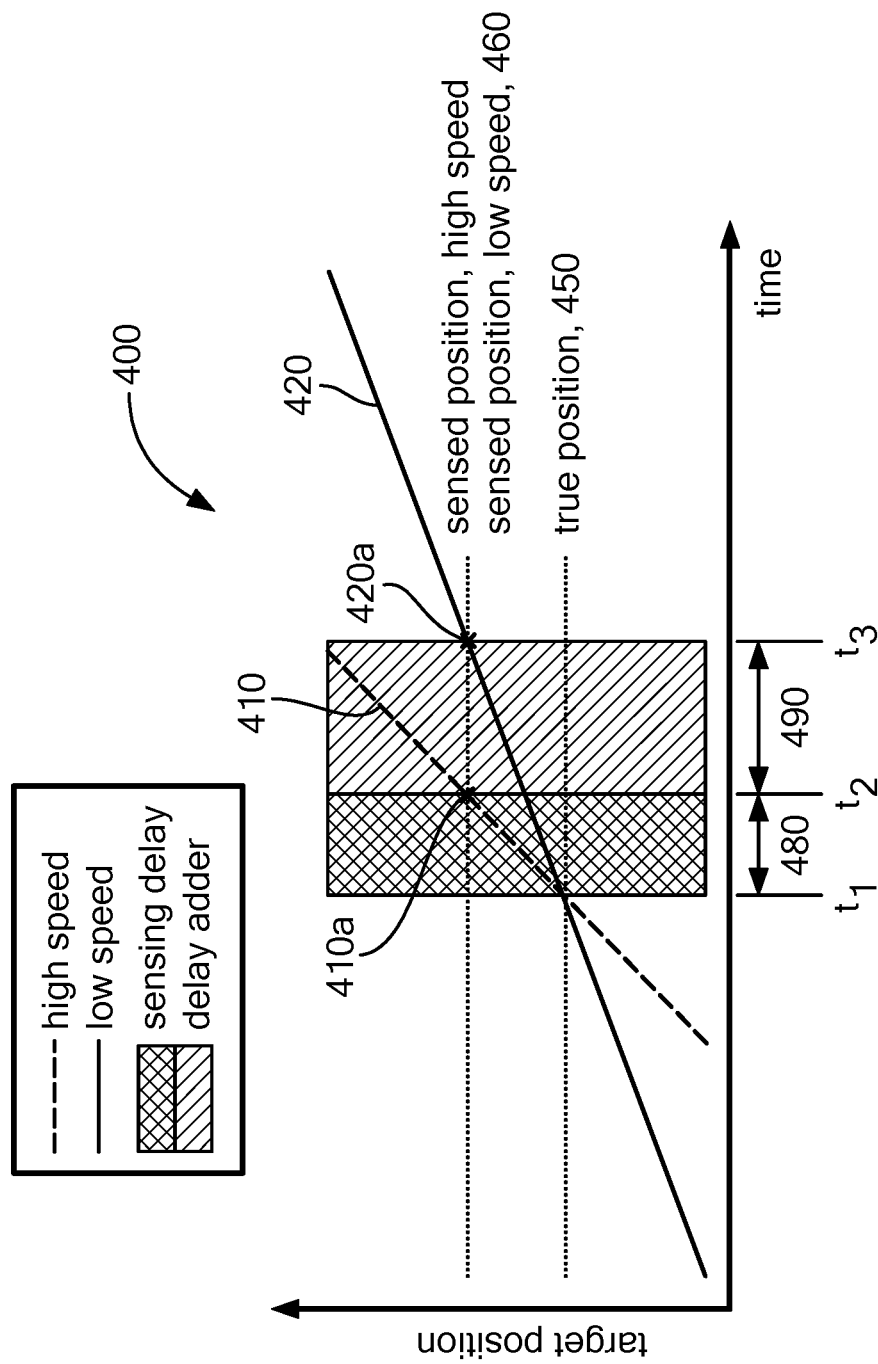
FIG. 4 illustrates an example target position detection over time for a target moving at high speed and a target moving at lower speed as achieved with the magnetic field sensor of FIG. 1.

Referring also to FIG. 4, illustrative signal waveforms as may be generated by the magnetic field sensor of FIGS. 1 and 3 are shown in a plot 400 having a horizontal axis with a scale in arbitrary units of time and a vertical axis with a scale in arbitrary units of distance to represent a position of a target relative to the magnetic field sensor 100, such as degrees of target rotation. The plot 400 includes waveforms 410 and 420 illustrating target detection by the magnetic field sensor 100 when the target is moving at a first speed and a second, lower speed, respectively. The slope of the signals 410, 420 varies in response to the speed of the object, as shown.

A first, inherent sensing delay 480 is illustrated as occurring between times t1 and t2 and corresponds to an electrical delay inherent in processing the magnetic field signal through the sensor. In other words, the inherent delay 480 is attributable to operation of elements by which magnetic field signal 102a (FIG. 1) is processed.

A second delay 490 as introduced by delay processor 350 (FIG. 3) or 180 (FIG. 1) is illustrated as occurring between times t2 and t3. This delay 490 can be introduced in various manners and is based on a delay determination by the delay processor based on the speed of motion of the target. Delay 490 can be referred to herein as an "applied" and/or "determined" delay.

The determination of the applied delay 490 is performed by the delay processor 350. In some embodiments, the delay processor 350 is configured to determine one or both of whether to apply a delay to the detector output signal and an amount of delay to be applied. In some embodiments, under certain speed conditions, there is no delay 490 introduced, and a delay is introduced only if the speed of motion of the target is lower than a predetermined threshold. For example, in the illustrated embodiment, for targets moving at least a first speed represented by curve 410, no additional delay is applied, so that the only detection delay is the inherent sensing delay 480; whereas, for targets moving slower than the first speed, an additional delay 490 is applied. In other embodiments, an applied delay 490 is always introduced, under all target speed conditions and the delay processor determines an amount of the applied delay 490 based on the speed of motion of the target.

The plot 400 additionally includes a horizontal line 450 to indicate a true or actual position of the target as is desired to be detected. Also shown by horizontal line 460 is the actual sensed target position. As is apparent, the resulting detected target position 410a (i.e., switchpoint) for a fast moving target is the same as the detected target position 420a (i.e., switchpoint) for a slower moving target, thereby resulting in a uniform detection response over target speed. In other words, by introducing the additional delay 490, both the faster moving target and the slower moving target sense the same target position (i.e., their target detections 410a, 420a coincide with the same target position as represented by horizontal line 460). In general, the additional delay 490 is selected to achieve a substantially uniform target position detection n over a range of target speeds.

Referring again to FIG. 3, the gain element 354 with factor "A" represents a translation or transformation from the speed signal 310a to a determined delay signal 350a indicative of a delay (e.g., an amount of delay or a duration of delay) to be applied in order to achieve a time delay 490 (FIG. 4) sufficient to achieve the desired uniformity of target position detection over speed. In general, the speed signal 310a is translated to the determined delay signal 350a based on a characterization of the inherent processing delay 480 of the system. In some embodiments, the delay signal 350a is linearly proportional to the speed of motion of the target. In some embodiments, the delay signal 350a is piecewise linear with respect to the speed of motion of the target. Alternatively, other relationships between the applied delay signal 350a and the speed of motion of the target are possible, as may follow other mathematical functions or relationships.

Various methodologies are possible for the delay processor 350 to determine the applied delay 490. In some embodiments, the delay processor 350 can include a memory device 358 (e.g., EEPROM) and/or a look-up table (LUT) 360. For example, the LUT 360, which may be provided as part of or separate from the memory device 358, can store one or more delay durations, each corresponding to one or more speeds or ranges of speeds of motion of the object. To this end, the LUT 360 can be coupled to receive the speed signal 310a and configured to output a delay amount via a signal line 350a. For example, the LUT 360 can output a delay amount 350a by retrieving a stored delay amount from the LUT 360 corresponding to a signal level of the received speed signal 310a.

In some embodiments, the delay processor 350 can perform a computation to provide the delay amount 350a (rather than storing such delay amounts in LUT 360). In one such embodiment, the speed signal 310a is received at an input of the gain unit 354 which responds to the speed signal 310a to compute a corresponding delay amount. For example, the gain unit 354 may compute the delay amount based on a mathematical function that characterizes a relationship between the delay 490 and the speed of motion of the target.

Referring again to FIG. 1, example ways in which the delay signal 350a (i.e., delay signal 180a in FIG. 1) can be used to introduce the determined delay 490 to be applied will be explained. In general, the magnetic field sensor 100 can include one or more delay elements with which the determined delay can be applied. The output signal 180a of delay processor 180 (like delay signal 350a provided by delay processor 350) can represent an amount of delay determined to be applied to the detector output signal 130a.

Delay signal 180a is illustrated as being coupled to various circuit components that can function as delay elements to apply the delay 490. It will be appreciated that the determined delay 180a can be introduced by one or more delay elements. It will also be appreciated that while the example delay elements explained below are elements of the magnetic field sensor 100 and thus serve additional purposes beyond introducing the applied delay 490, additional elements can be added to the sensor for the dedicated purpose of introducing the applied delay 490.

By way of non-limiting examples, the delay signal 180a can be coupled to filter 110 and the determined delay can be introduced by reducing the filter bandwidth. This arrangement can provide an added advantage of improved signal to noise ratio achieved with the additional filtering.

As an alternative or additional delay element, the delay signal 180a can be coupled to the ADC 112 and the determined delay can be introduced by adjusting a speed of the ADC clock signal. More generally, any digital element in the signal path from the magnetic field sensing element 102 to the detector output signal 130a can provide the delay element and can be used to introduce the determined delay by adjusting the speed of its clock signal. This arrangement can provide an added advantage of reduced power consumption.

As yet another alternative or additional delay element, the delay signal 180a can be coupled to the motion detector 130 to introduce the determined delay with a delay element in line with the signal path. For example, a comparator can be provided to compare the signal to a threshold and adjust the delay by changing a bias current of the comparator.

Figure 5:
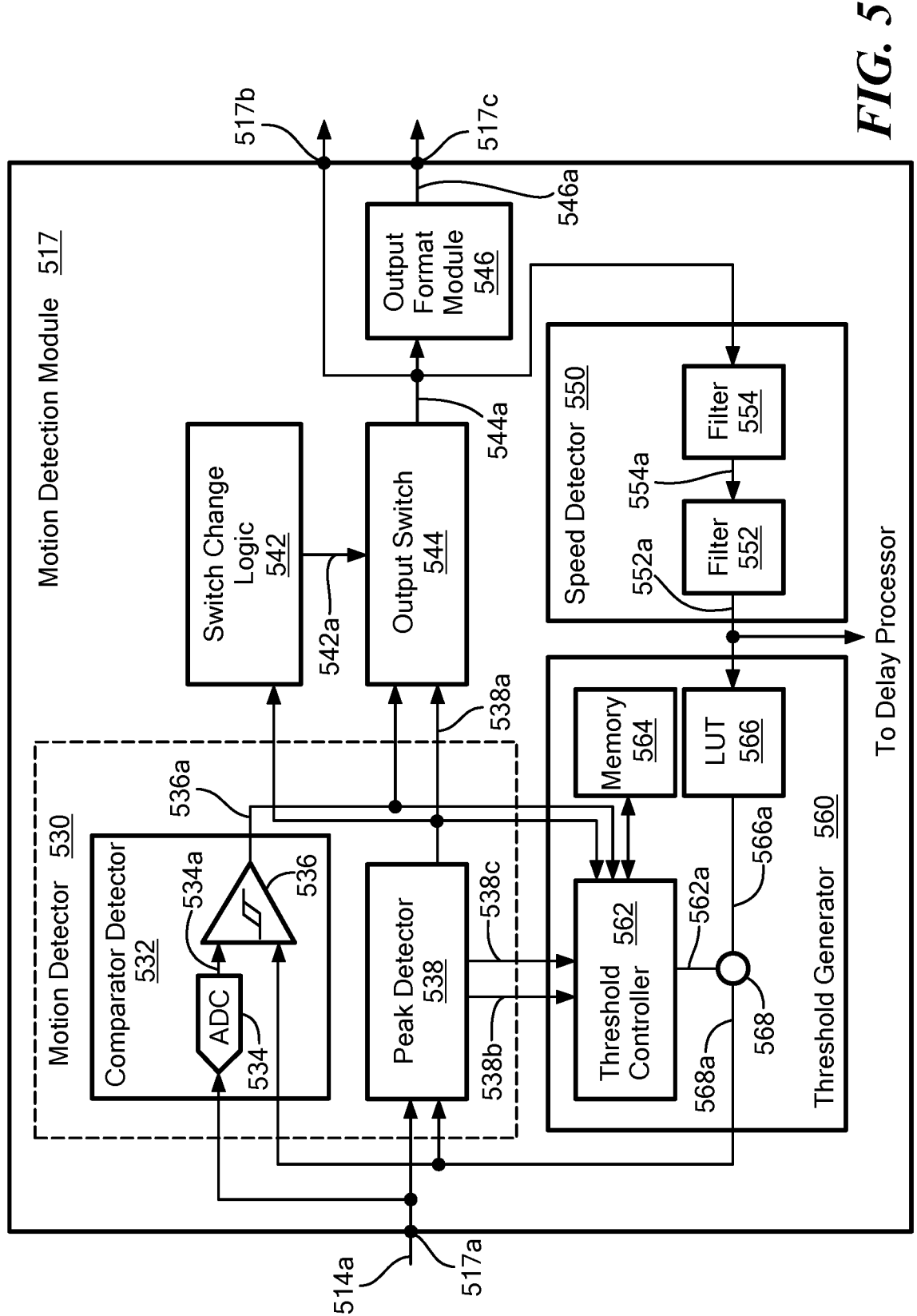
FIG. 5 is a block diagram of an example motion detection module of the magnetic field sensor of FIG. 1.

Referring also to FIG. 5, an example motion detection module 517 as may be the same as or similar to motion detection module 117 of FIG. 1 is shown. Motion detection module 517 is coupled to receive a signal 514a (also referred to herein as a "magnetic field signal," which can be the same as or similar to the controller output signal 114a of FIG. 1) at an input terminal 517a. The motion detection module 517 includes a motion detector 530 having a first input coupled to the input terminal 517a and a second input coupled to the output of a threshold generator 560. The motion detector 530 receives the magnetic field signal 514a and a threshold signal 568a generated by the threshold generator 560 and is configured to generate a detector output signal having edges occurring in response to a comparison of the signal 514a and the threshold signal 568a.

The motion detector 530 can include one or more detectors, for example, a comparator detector 532 and a peak detector 538, as shown, each coupled to receive the magnetic field signal 514a and the threshold signal 568a and to provide a respective output signal 536a, 538a having edges indicative of motion of the object (i.e., a target object).

The comparator detector 532 includes an ADC 534 and a comparator 536, the ADC 534 coupled to receive the signal 514a and the comparator 536 coupled to receive the threshold signal 568a and a signal 534a from the output of the ADC 534. In some embodiments, however, the ADC 534 is optional (e.g., when signal 514a is a digital signal), in which case the comparator 536 is coupled to receive the signal 514a. Additionally, in some embodiments, the ADC 534 may be replaced with a digital-to-analog converter (DAC) (e.g., when the comparator 536 is an analog comparator and the signal 514a is a digital signal). The comparator 536 receives the threshold signal 568a and the signal 534a (or signal 514a) and generates a comparator detector output signal 536a having edges occurring in response to a comparison of the signal 534a (or signal 514a) and a comparator threshold as may be set by the threshold signal 568a.

Depending upon the arrangement of magnetic field sensing element(s) (e.g., 102, shown in FIG. 1) in the magnetic field sensor (e.g., 100, shown in FIG. 1), the comparator detector 532 can be operable as a tooth detector (e.g., a true power on state (TPOS) detector) or as an edge detector. As one example, where the magnetic field sensor includes a single magnetic field sensing element 102 as shown above in conjunction with FIG. 1, the comparator detector 532 is operable as a tooth detector (as opposed to an edge detector), and therefore, provides a TPOS function, able to distinguish a tooth in the object 170 (FIG. 1) from a valley, even before any motion of object 170. In contrast, the comparator detector 532 may be operable as an edge detector when the magnetic field sensor (e.g., 100, shown in FIG. 1) includes more than one magnetic field sensing element arranged in a differential arrangement.

The peak detector 538 is configured to track positive and negative peaks of the magnetic field signal 514a and generate a peak detector output signal 538a at a first output in response to the signal 514a crossing a threshold signal 568a that is based on the detected peaks. To this end, the peak detector 538 may include one or more DACs to generate positive and negative peak signals 538b, 538c (sometimes referred to as an NDAC and PDAC signal, respectively), at second and third outputs, respectively, which signals are indicative of magnitudes of positive peaks and negative peaks of the signal 514a and may also be representative of a tracking signal.

The peak detector 538 may take various forms, for example, peak detector 538 may take the form of a peak-to-peak percentage detector in which the threshold signal 568a is a percentage of the peak-to-peak value of the tracking signal (i.e., a percentage of the peak-to-peak difference between the positive tracking signal 538b and the negative tracking signal 538c). One such peak-to-peak percentage detector is described in U.S. Pat. No. 5,917,320 entitled "Detection of Passing Magnetic Articles While Periodically Adapting Detection Threshold," which is assigned to the assignee of the present disclosure and incorporated herein by reference in its entirety.

In an alternative embodiment, the peak detector 538 may take the form of a so-called slope-activated or peak-referenced detector in which the threshold signal 568a differs from the positive and/or negative peaks (i.e., the peaks and valleys) of the magnetic field signal 514a by a predetermined amount. Thus, in this type of detector, the peak detector output signal 538a changes state when the magnetic field signal 514a departs from a peak and/or valley (as provided by the positive and negative tracking signals 538b, 538c) by the predetermined amount. One such slope-activated detector is described in U.S. Pat. No. 6,091,239 entitled "Detection of Passing Magnetic Articles with a Peak Referenced Threshold Detector," which is assigned to the assignee of the present disclosure and incorporated herein by reference in its entirety.

The motion detection module 517 also includes switch change logic 542, an output switch 544 and an output format module 546, one or more of which may be provided as part of the motion detector 530 or an output signal generator, similar to the output signal generator 140 of FIG. 1. The switch change logic 542 has an input coupled to the peak detector output and the output switch 544 has a first input coupled to the switch change logic output, a second input coupled to the comparator detector output, and a third input coupled to the peak detector output. By way of a control signal 542a generated by switch change logic 542, the output switch 544 provides a detector output signal 544a representative of a selected one of the comparator detector output signal 536a or the peak detector output signal 538a at a first output terminal 517b of the motion detection module 517. In one embodiment, the output switch 544 selects the comparator detector output signal 536a to provide the detector output signal 544a at power on and the switch change logic 542 causes the output switch 544 to select the peak detector output signal 538a as the detector output signal after a predetermined number of edges of the peak detector output signal have been detected. It will be appreciated by those of ordinary skill in the art that other schemes are possible for selecting which output signal 536a, 538a provides the detector output signal 544a.

The detector output signal 544a, which can be the same as or similar to the detector output signal 130a of FIG. 1, can be a two state output signal for which a high state is indicative of one of the teeth of the object 170 of FIG. 1 being proximate to the magnetic field sensing element 102 of FIG. 1, and for which a low state is indicative of one of the valleys of the object 170 being proximate to the magnetic field sensing element 102 for example. However, in other embodiments, states of the detector output signal 544a can be reversed from those described above and/or can be representative of other features of the object 170. The detector output signal 544a can be indicative of the speed of motion of the object 170. In some embodiments, for example, the detector output signal 544a is a two state square-wave signal with edges occurring at a frequency proportional to the speed of motion of the object 170.

Motion detection module 517 can include an output format module 546 coupled to receive the detector output signal 544a and configured to provide a sensor output signal 546a at a second output terminal 517c of the motion detection module 517. The output format module 546 may provide the sensor output signal 546a in various forms and may encode additional information to provide the sensor output signal 546a. For example, in some embodiments, the sensor output signal 546a is indicative of the direction of motion of the object 170 and may be provided in the form of a two-state signal having a frequency proportional to the speed of motion of the object 170 and a duty cycle (or pulse width or on-time duration) representative of the direction of motion of the object 170. In other embodiments, the sensor output signal 546a is provided in the form of a digital word representative of the speed of motion of the object 170 and the direction of motion of the object 170. It will be appreciated however that various schemes are possible to communicate direction information in the sensor output signal 546a, such as those described in the above referenced U.S. Pat. No. 8,624,588. The sensor output signal 546a can be provided in a variety of formats, for example, a SENT format, a CAN format, or an I²C format. Other formats are also possible.

The motion detection module 517 additionally includes a speed detector 550 having an input coupled to receive motion detector output signal 544a. The speed detector 550 includes a filter 552 and a counter 554 and may be the same as or similar to speed detector 310 of FIG. 3. Speed detector 550 is configured to generate a speed signal 552a indicative of a speed of motion of the object (e.g., object 170, shown in FIG. 1).

The motion detection module 517 additionally includes a threshold generator 560. Threshold generator 560 can take various forms to provide one or more threshold signals or values to the motion detector 530. The example threshold generator 560 is responsive to the speed signal 552a and is configured to generate one or more threshold signals having a level that varies based on the speed of motion of the target object. It will be appreciated however, that other threshold generation schemes are possible that do not take into account the speed of motion of the object, including but not limited to use of a fixed threshold level, a threshold level that is a percentage of the peak-to-peak value of the tracking signal, or a threshold level that differs from the positive and/or negative peaks of the magnetic field signal by a predetermined amount.

The threshold generator 560 has a threshold controller 562, a memory device 564 (e.g., EEPROM), a look-up table (LUT) 566 and a threshold output module 568. The threshold generator 560 is coupled to receive the speed signal 552a, the positive peak signal 538b, the negative peak signal 538c, the peak detector output signal 538a and the comparator detector output signal 536a and is configured to generate the threshold signal 568a having a level that varies at least in response to the speed signal 552a.

The LUT 566, which may be provided as part of or separate from the memory device 564, is configured to store one or more parameters associated with the magnetic field sensor (e.g., 100, shown in FIG. 1), such as a plurality of threshold adjustment amounts according to at least the speed of motion of the object (e.g., 170, shown in FIG. 1). The threshold adjustment amounts may, for example, additionally be based on circuit delays and signal properties of the magnetic field sensor and/or the particular application in which the magnetic field sensor is being used (e.g., an automotive application) and may be used to adjust the level of a threshold controller signal 562a in order to generate the threshold signal 568a. In some embodiments, at least one of the threshold adjustment amounts is a predetermined value, as may be established during manufacture of the sensor and/or as may be user programmable. Alternatively or additionally at least one of the threshold adjustment amounts may be calculated during manufacture, during initialization (or power-on) of the magnetic field sensor, and/or during normal operation of the magnetic field sensor. In general, each threshold adjustment amount (referred to herein alternatively as threshold adjustment signal 566a) corresponds to a respective speed or range of speeds of motion of the object.

The LUT 566 is coupled to receive the speed signal 552a and configured to output a threshold adjustment signal 566a as a selected one of the stored threshold adjustment amounts. As one example, the LUT 566 can output the threshold adjustment signal 566a by retrieving a stored threshold adjustment amount from the LUT 566 corresponding to a signal level of the received speed signal 552a. In some embodiments, a computation in the threshold controller 562 or another suitable device may be performed to provide a threshold adjustment amount (rather than storing such threshold adjustment amounts in LUT 566). In one such embodiment, the speed signal 552a is received at an input of the threshold output module 568 which responds to the speed signal 552a to compute a corresponding threshold adjustment amount.

The threshold controller 562 is coupled to receive one or more of the positive and negative peak signals 538b, 538c generated by the peak detector 538, the peak detector output signal 538a, the comparator detector output signal 536a, and/or a stored threshold value 564a from the memory device 564, and is configured to generate the threshold controller signal 562a. The threshold controller 562 may also be coupled to receive a power on-off signal representative of a power on or a power off of the magnetic field sensor.

The threshold controller signal 562a represents the threshold signal for use by the selected detector (e.g., detector 532 or 538) without adjustment based on the speed signal 552a. As one example in which the threshold signal 568a is being provided to the peak detector 538 and the peak detector 538 is a peak-to-peak percentage detector, the threshold controller signal 562a can be a value representative of a predetermined percentage, for example, seventy percent, of a voltage difference between the positive and negative peak signals 538b, 538c at a particular point in time. As another example in which the threshold signal 568a is being provided to the peak detector 538 and the peak detector 538 is a peak-referenced detector, the threshold controller signal 562a can be a value representative of a predetermined offset from the positive peak signal 538b and/or the negative peak signal 538c at a particular point in time. As another example in which the threshold signal 568a is being provided to the comparator detector 532, the threshold controller signal 562a can be a predetermined, fixed threshold value 564a stored in the memory device 564, such as may be preset (such as during manufacture) or user-programmable.

The memory device 564 (e.g., EEPROM) may additionally or alternatively store one or more threshold values 564a in the form of a threshold controller signal 562a generated by the threshold controller 562 and/or a threshold signal 568a, such as may be desirable for use upon a subsequent power up of the sensor. The threshold controller 562 may, for example, control the memory device 564 (or cause storage in the memory device 564) by way of a control line. Various schemes are possible for controlling when storage of a threshold value 564a occurs.

In one embodiment, the threshold controller 562 causes threshold value storage in the memory device 564 when the threshold controller signal 562a changes by a predetermined amount, which amount can be zero or more. In another embodiment, the threshold controller 562 causes storage when the threshold controller signal 562a differs from a predetermined stored threshold value by a predetermined amount, which amount can be zero or more. In another embodiment, the threshold controller 562 causes storage when the threshold controller 562 receives a signal (e.g., a power on/off signal) indicative of a power off condition of the magnetic field sensor (e.g., 100, shown in FIG. 1). In another embodiment, the threshold controller 562 causes storage when the comparator detector output signal 536a and/or the peak-detector output signal 538a has changed state a predetermined number of times after the magnetic field sensor has powered on. Storage operation by the threshold controller 562 in the memory device 564 can also have any combination of the above storage arrangements and/or arrangements described in the above-referenced U.S. Pat. No. 9,395,391.

The threshold output module 568, which may include a summing circuit, for example, is coupled to receive the threshold controller signal 562a and the threshold adjustment signal 566a and configured to generate a threshold signal 568a as a combination of the threshold controller signal 562a and the threshold adjustment signal 566a. As one example, the threshold signal 568a is a summation of the threshold adjustment signal 566a and the threshold controller signal 562a when the speed signal 552a indicates a speed of motion of the object greater than a predetermined speed and the threshold signal 568a is equal to the threshold controller signal 562a when the speed signal 552a indicates a speed of motion of the object less than the predetermined speed. In this way, the threshold signal 568a is at a first signal level when the speed of motion of the object is greater than the predetermined speed and the threshold signal 568a is at a second signal level when the speed of motion is less than the predetermined speed. It should of course be appreciated that the threshold signal 568a may be adjusted to additional signal levels (e.g., a third signal level, a fourth signal level, etc.) in response to the speed of motion of the object being within different ranges of speeds.

It will be appreciated that adjusting the threshold signal 568a based on the speed of motion of the target as explained above can improve the target detection accuracy. Aspects of threshold generation based on target speed are described in U.S. Pat. No. 9,970,996, issued May 15, 2018, entitled "Methods And Apparatus For Generating A Threshold Signal In A Magnetic Field Sensor" and assigned to the Assignee of the subject application, which patent is hereby incorporated herein in its entirety. For example, as explained in U.S. Pat. No. 9,970,996, the threshold output module 568 can be configured to generate multiple threshold signals 568a.

As described above and will be appreciated by one of skill in the art, embodiments of the disclosure herein may be configured as a system, method, or combination thereof. Accordingly, embodiments of the present disclosure may be comprised of various means including hardware, software, firmware or any combination thereof. Furthermore, embodiments of the present disclosure may take the form of a computer program product on a computer-readable storage medium having computer readable program instructions (e.g., computer software) embodied in the storage medium. Any suitable non-transitory computer-readable storage medium may be utilized.

All references cited herein are hereby incorporated herein by reference in their entirety.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Having described preferred embodiments, it will now become apparent to one of ordinary skill in the art that other embodiments incorporating their concepts may be used.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

It is felt therefore that these embodiments should not be limited to disclosed embodiments, but rather should be limited only by the spirit and scope of the appended claims.

What is claimed is:

1. A magnetic field sensor for detecting motion of an object, comprising:
   one or more magnetic field sensing elements configured to generate a magnetic field signal in response to a magnetic field associated with the object;
   a motion detector responsive to the magnetic field signal and to a threshold signal and configured to generate a detector output signal having edges occurring in response to a comparison of the magnetic field signal and the threshold signal;
   a speed detector responsive to the detector output signal to generate a speed signal indicative of a speed of motion of the object; and
   a delay processor responsive to the speed signal and configured to determine a delay for the detector output signal based on the speed of motion of the object.

2. The magnetic field sensor of claim 1, wherein the delay processor is further configured to determine one or both of whether to apply a delay to the detector output signal and an amount of the delay to be applied to the detector output signal.

3. The magnetic field sensor of claim 2, wherein the delay processor is configured to determine that the delay be applied to the detector output signal if the speed of motion of the object is lower than a predetermined level.

4. The magnetic field sensor of claim 1, wherein the delay comprises a duration that is linearly proportional to the speed of motion of the object.

5. The magnetic field sensor of claim 1, wherein the delay comprises a duration that is piecewise linear with respect to the speed of motion of the object.

6. The magnetic field sensor of claim 1, wherein the delay processor comprises a memory device configured to store a plurality of delay durations, each corresponding to one or more speeds of motion of the object.

7. The magnetic field sensor of claim 1, wherein the delay processor is configured to compute the delay based on a mathematical function that characterizes a relationship between the delay and the speed of motion of the object.

8. The magnetic field sensor of claim 1, further comprising a delay element configured to apply the delay to the detector output signal.

9. The magnetic field sensor of claim 8, wherein the delay element comprises a filter coupled to the delay processor.

10. The magnetic field sensor of claim 8, wherein the delay element comprises a digital element coupled to the delay processor and wherein the delay corresponds to a speed of a clock associated with the digital element.

11. The magnetic field sensor of claim 10, wherein the digital element comprises an analog-to-digital converter.

12. The magnetic field sensor of claim 1, wherein the speed detector comprises a counter responsive to the detector output signal and configured to generate a count signal having a value corresponding to a duration between like edges of the detector output signal.

13. The magnetic field sensor of claim 12, wherein the speed detector further comprises a filter responsive to the count signal and configured to generate the speed signal.

14. The magnetic field sensor of claim 13, wherein the speed signal is generated as an average of a predetermined number of count signal values and wherein the predetermined number of count signal values corresponds to a number of features of the object.

15. The magnetic field sensor of claim 1, wherein the magnetic field sensor further comprises a threshold generator responsive to the speed signal to generate the threshold signal having a level that varies in response to the speed signal.

16. The magnetic field sensor of claim 15, wherein the threshold signal is at a first signal level when the speed signal indicates a speed of motion of the object greater than a predetermined speed and wherein the threshold signal is at a second signal level when the speed signal indicates a speed of motion of the object less than the predetermined speed.

17. The magnetic field sensor of claim 15, wherein the threshold generator comprises a memory device configured to store a plurality of threshold adjustment amounts, each corresponding to one or more speeds of motion of the object.

18. The magnetic field sensor of claim 17, wherein the threshold generator further comprises a summing circuit responsive to at least a stored threshold adjustment amount and configured to generate the threshold signal.

19. The magnetic field sensor of claim 1, wherein the object is comprised of a magnetic material and wherein the magnetic field is generated by object.

20. The magnetic field sensor of claim 1, further comprising a magnet configured to generate the magnetic field, wherein the object is comprised of a ferromagnetic material and wherein the magnetic field is affected by movement of the object.

21. The magnetic field sensor of claim 1, wherein the one or more magnetic field sensing elements comprises a Hall effect element, a magnetoresistance element, or both.

22. The magnetic field sensor of claim 15, wherein the motion detector comprises a tracking circuit responsive to the magnetic field signal and configured to track peaks of the magnetic field signal and generate a tracking signal and wherein the threshold generator is further responsive to the tracking signal to generate the threshold signal.

23. The magnetic field sensor of claim 22, wherein the detector output signal transitions when a difference between one or more tracked peaks of the magnetic field signal and the threshold signal exceeds a predetermined amount.

24. The magnetic field sensor of claim 22, wherein the tracking signal tracks positive and negative peaks of the magnetic field signal and wherein the threshold signal is provided as a predetermined percentage of a peak-to-peak value of the tracking signal.

25. A method for detecting motion of an object, comprising:
   receiving a magnetic field signal generated in response to a magnetic field associated with an object;
   generating a detector output signal in response to the magnetic field signal and a threshold signal, the detector output signal having edges occurring in response to a comparison of the magnetic field signal and the threshold signal;
   generating a speed signal indicative of a speed of motion of the object in response to the detector output signal; and determining a delay for the detector output signal based on the speed signal.

26. The method of claim 25, wherein determining the delay comprises one or both of whether to apply a delay to the detector output signal and an amount of the delay to be applied to the detector output signal.

27. The method of claim 26, wherein determining the delay comprises determining that the delay be applied to the detector output signal if the speed of motion of the object is lower than a predetermined level.

28. The method of claim 25, wherein the delay comprises a duration that is linearly proportional to the speed of motion of the object.

29. The method of claim 25, wherein the delay comprises a duration that is piecewise linear with respect to the speed of motion of the object.

30. The method of claim 25, further comprising:
filtering the magnetic field signal with a filter; and
applying the delay with the filter.

31. The method of claim 25, further comprising:
converting the magnetic field signal into a digital signal with an analog-to-digital converter; and
applying the delay by adjusting a clock signal coupled to the analog-to-digital converter.

32. The method of claim 25, further comprising generating the threshold signal in response to the speed signal, the threshold signal having a level that varies in response to the speed signal.

33. A magnetic field sensor for detecting motion of an object, comprising:
one or more magnetic field sensing elements configured to generate a magnetic field signal in response to a magnetic field associated with the object;
a motion detector responsive to the magnetic field signal and to a threshold signal and configured to generate a detector output signal having edges occurring in response to a comparison of the magnetic field signal and the threshold signal;
a speed detector responsive to the detector output signal to generate a speed signal indicative of a speed of motion of the object; and
means, responsive to the speed signal, for determining a delay for the detector output signal based on the speed of motion of the object.

* * * * *